(12) United States Patent
Hamazaki

(10) Patent No.: US 10,934,459 B2
(45) Date of Patent: Mar. 2, 2021

(54) ADHESIVE TAPE STRUCTURE

(71) Applicant: DEXERIALS CORPORATION, Tokyo (JP)

(72) Inventor: Kazunori Hamazaki, Tochigi (JP)

(73) Assignee: DEXERIALS CORPORATION, Tokyo (JP)

( * ) Notice: Subject to any disclaimer, the term of this patent is extended or adjusted under 35 U.S.C. 154(b) by 69 days.

(21) Appl. No.: 16/085,613

(22) PCT Filed: May 8, 2017

(86) PCT No.: PCT/JP2017/017425
§ 371 (c)(1),
(2) Date: Sep. 17, 2018

(87) PCT Pub. No.: WO2017/199781
PCT Pub. Date: Nov. 23, 2017

(65) Prior Publication Data
US 2019/0071590 A1    Mar. 7, 2019

(30) Foreign Application Priority Data
May 20, 2016  (JP) .............................. JP2016-101689

(51) Int. Cl.
*C09J 7/40* (2018.01)
*C09J 7/20* (2018.01)

(52) U.S. Cl.
CPC ................ *C09J 7/403* (2018.01); *C09J 7/20* (2018.01); *C09J 7/40* (2018.01); *C09J 2203/326* (2013.01);
(Continued)

(58) Field of Classification Search
CPC ....... C09J 7/403; C09J 7/20; C09J 7/40; C09J 2201/602; C09J 2203/326; Y10T 428/14
See application file for complete search history.

(56) References Cited

U.S. PATENT DOCUMENTS 3,503,568 A * 3/1970 Galley ..................... G03C 3/00
                                                      242/583
4,917,753 A * 4/1990 Torgerson ................. C09J 7/20
                                                      156/324
(Continued)

FOREIGN PATENT DOCUMENTS

JP    H01-068829 U    5/1989
JP    2004-211017 A   7/2004
(Continued)

OTHER PUBLICATIONS

Machine translation of WO 2015/087883 A1. (Year: 2015).*
(Continued)

*Primary Examiner* — Patricia L. Nordmeyer
(74) *Attorney, Agent, or Firm* — Oliff PLC

(57) ABSTRACT

An adhesive tape structure can suppress protrusion of adhesive agent and blocking. The adhesive tape structure includes adhesive tapes each provided with a base film, an adhesive film, and a cover film laminated in this order, and a linking tape linking the adhesive tapes and configured such that the cover films of the adhesive tapes are integrally released. The adhesive tapes each have a part having a predetermined length completely removed from an edge portion of the adhesive film on a release initiation side in a cover film release direction; the adhesive tape thus has gaps in the edge portions of the adhesive films.

6 Claims, 10 Drawing Sheets

(52) U.S. Cl.
CPC ........ *C09J 2301/314* (2020.08); *Y10T 428/14* (2015.01); *Y10T 428/1476* (2015.01)

(56) References Cited

U.S. PATENT DOCUMENTS

| | | | |
|---|---|---|---|
| 10,328,670 B2 * | 6/2019 | Singh | ...................... B32B 27/06 |
| 2003/0125686 A1 | 7/2003 | Beitz et al. | |

FOREIGN PATENT DOCUMENTS

| | | | | |
|---|---|---|---|---|
| JP | 2008-156126 A | 7/2008 | | |
| JP | 2015-086325 A | 5/2015 | | |
| JP | 2015-113382 A | 6/2015 | | |
| JP | 2015-212359 A | 11/2015 | | |
| WO | WO-2015087883 A1 * | 6/2015 | ............. | B65H 21/00 |

OTHER PUBLICATIONS

Aug. 8, 2017 International Search Report issued in International Patent Application No. PCT/JP2017/017425.
Jan. 17, 2020 Office Action issued in Korean Patent Application No. 10-2018-7030126.

\* cited by examiner

ADHESIVE TAPE STRUCTURE

TECHNICAL FIELD

The present disclosure relates to an adhesive tape structure in which an adhesive film is linked and elongated. This application claims priority to Japanese Patent Application No. 2016-101689 filed on May 20, 2016, the entire content of which is hereby incorporated by reference.

BACKGROUND ART

Conventionally known adhesive films for adhering a variety of components, such as electrical components, include ACF (Anisotropic Conductive Film) as well as NCF (Non Conductive Film). Such adhesive films are, for example, sandwiched between a base film and a cover film in the form of a long and narrow adhesive tape wound on a reel for storage, handling, and shipping.

It has been desirable in recent years to "elongate" or maximize the length of adhesive tape that can be wound around a single reel. For example, PLT 1 proposes elongating adhesive tapes by linking via a linking tape configured such that a releasable cover film of the adhesive tapes and a release film of the linking tape can be integrally released, allowing the adhesive film of the adhesive tapes to be successively applied to targeted objects using an applicator.

CITATION LIST

Patent Literature

PLT 1: Japanese Unexamined Patent Application Publication No. 2015-086325

SUMMARY OF INVENTION

Technical Problem

However, conventional elongation techniques can suffer from protruding adhesive agent in linking portions between adhesive tapes and linking tapes, which are thicker than other portions, for example, due to pressure increases accompanying an increased number of winding turns. Furthermore, in the case of adhesive agent protruding, the adhesive film might separate from the base film during release of the cover film, which might cause blocking.

In order to solve the aforementioned problems, an object of the present disclosure is to provide an adhesive tape structure which can suppress protrusion of adhesive agent and occurrence of blocking.

Solution to Problem

In view of the problems described above, an adhesive tape structure according to the present disclosure includes a plurality of adhesive tapes having a base film, an adhesive film, and a cover film laminated in this order, and a linking tape linking the adhesive tapes and configured such that the cover films of the plurality of adhesive tapes are integrally released, the adhesive tapes having at least a part of an edge portion removed from the adhesive film on a release initiation side in a cover film release direction.

Furthermore, a method for manufacturing an adhesive tape structure according to the present disclosure includes a removing step of removing, from an adhesive tape raw sheet having a base film, an adhesive film, and a cover film laminated in this order, at least a part of an edge portion of the adhesive film on one side in a long direction of the adhesive tape raw sheet, a linking step of aligning the edge portions of the adhesive film having at least a part removed and linking between adhesive tape raw sheets and a linking tape raw sheet such that cover films of a plurality of adhesive tape raw sheets are integrally released, a cutting step of cutting the linked adhesive tape raw sheets and linking tape raw sheet to a predetermined length, and a winding step of winding the cut adhesive tape and linking tape onto a reel such that the edge portion of the adhesive film having at least a part removed is on the release initiation side in the cover film release direction.

Advantageous Effects of Invention

According to the present disclosure, because at least a part of an edge portion of an adhesive film on a release initiation side in a cover film release direction is removed, protrusion of adhesive agent as well as occurrence of blocking can be suppressed.

DESCRIPTION OF EMBODIMENTS

Embodiments of the present disclosure will now be described in detail according to the following order.
1. Adhesive Tape Structure Application Apparatus
2. Adhesive Tape Structure
3. Examples

1. Adhesive Tape Structure Application Apparatus

Figure 1:
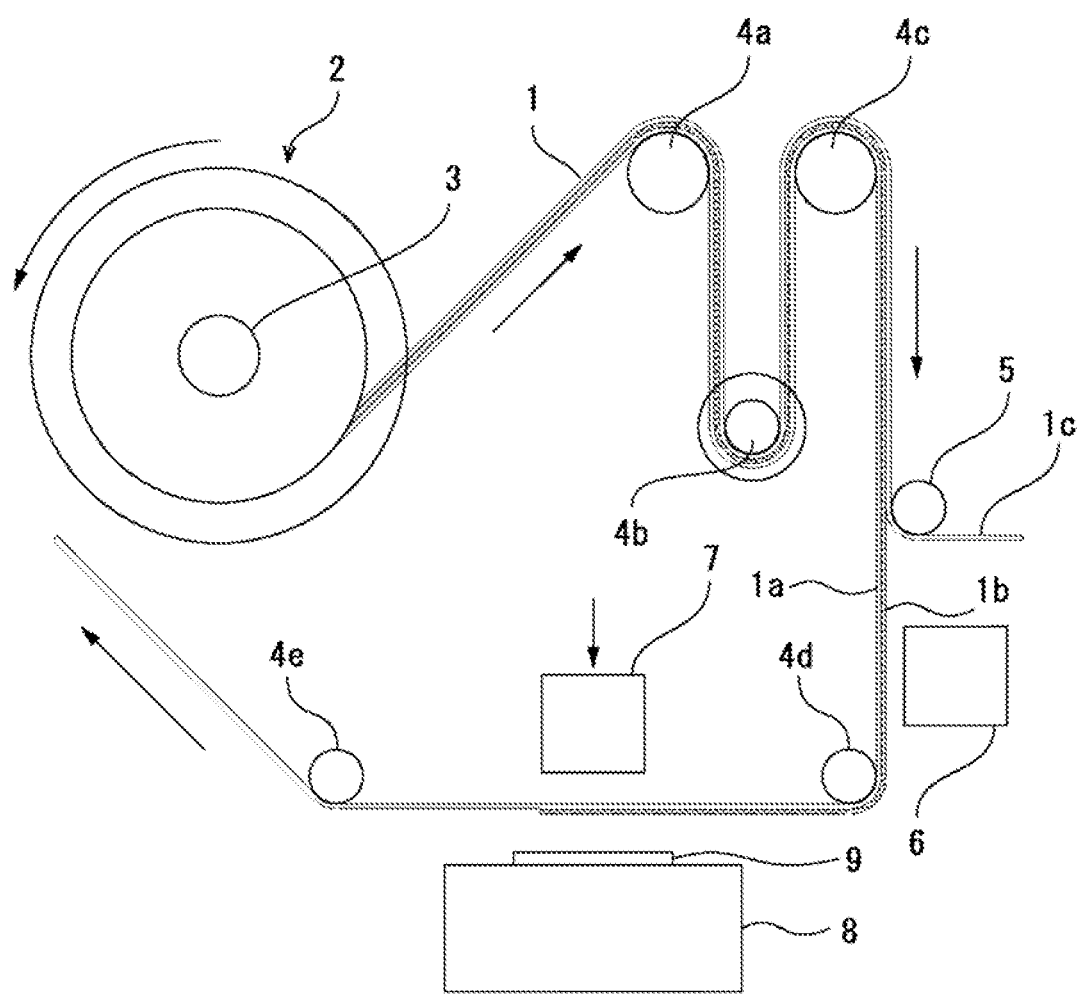
FIG. 1 is a view schematically illustrating an application apparatus for applying an adhesive film to a target object.

FIG. 1 is a view schematically illustrating an application apparatus for applying an adhesive film to a target object. As illustrated in FIG. 1, an application apparatus includes an adhesive tape 1 wound around a reel 2 mounted on a winding shaft 3, rollers 4a to 4e for guiding the adhesive tape structure, a release roller 5 for releasing the cover film, a cutter 6 for cutting the adhesive film to a predetermined length, and an applicator 7 for applying the adhesive film.

The adhesive tape structure, as described below, includes a plurality of adhesive tapes 1 having a base film 1a, an adhesive film 1b, and a cover film 1c, laminated in this order, linked via a linking tape. The adhesive tape structure, without particular limitation, preferably has a length of 50 to 5000 m to avoid frequent reel replacements.

The adhesive tape structure is drawn out from the reel 2 and guided by the rollers 4a to 4e; first, the cover film 1c is released by the release roller 5, and the cover film 1c is wound up. Next, the cutter 6 makes a half-cut by cutting the adhesive film 1b to a predetermined length without cutting the base film 1a. Then, a thermocompression bonding head of the applicator 7 presses the adhesive tape 1b from the base film 1a side so that a predetermined length of the adhesive film 1b is transferred to a target object 9 on a stage 8. After transfer of the adhesive film 1b, the remaining base film 1a of the adhesive tape 1 is wound up.

Moreover, the application apparatus controls to prevent the thermocompression bonding head from pressing the linking tape. For example, a non-transparent linking tape is used, and the linking tape is detected by a light sensor of the cutter 6 to control dispensing of the adhesive tape structure in order to avoid half-cutting the linking tape or pressing the linking tape with the thermocompression bonding head.

2. Adhesive Tape Structure

Figure 2:
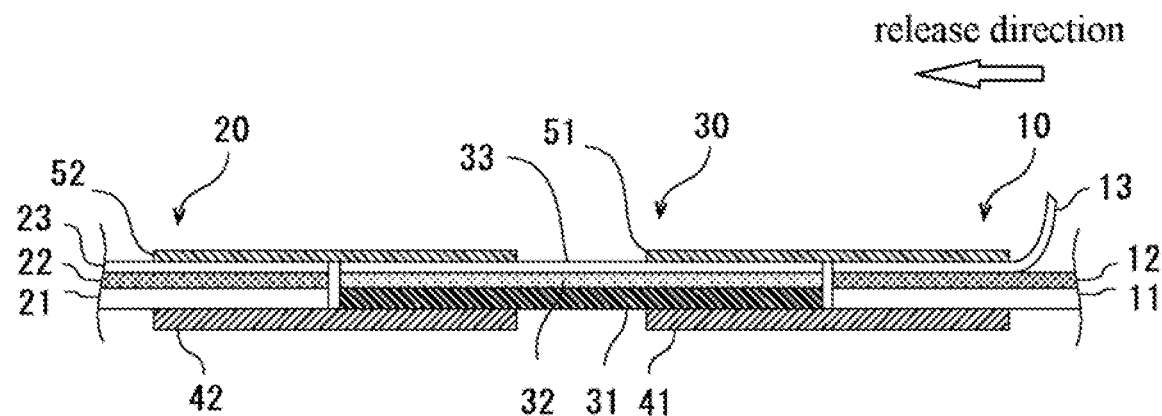
FIG. 2 is a cross-sectional view schematically illustrating a linking portion of an adhesive tape structure according to an example.

FIG. 2 is a cross-sectional view schematically illustrating a linking portion of an adhesive tape structure according to an embodiment. As illustrated in FIG. 2, the adhesive tape structure includes a first adhesive tape 10, a second adhesive tape 20, and a linking tape 30 linking the first adhesive tape 10 and the second adhesive tape 20.

The first adhesive tape 10 and the second adhesive tape 20 respectively have base films 11, 21, adhesive films 12, 22, and cover films 13, 23, laminated in this order. The linking tape 30 has a linking matrix 31, an adhering film 32, and a release film 33 laminated in this order.

Moreover, an edge portion of the base film 11 of the first adhesive tape 10 and an edge portion of the linking matrix 31 of the linking tape 30 are adhered to a first base-side adhesive member 41 and an edge portion of the base film 21 of the second adhesive tape 20 and an edge portion of the linking matrix 31 of the linking tape 30 are adhered to a second base-side adhesive member 42. The base films 11, 21 and the linking matrix 31 are thus configured to be integrally released.

Furthermore, an edge portion of the cover film 13 of the first adhesive tape 10 and an edge portion of the release film 33 of the linking tape 30 are adhered to a first cover-side adhesive member 51 and an edge portion of the cover film 23 of the second adhesive tape 20 and an edge portion of the release film 33 of the linking tape 30 are adhered to a second cover-side adhesive member 52. The cover films 13, 23 and the release film 33 are thus configured to be integrally released.

The base-side adhesive members 41, 42 and the cover-side adhesive member 51, 52 are provided with adhesive agent layers such as of acrylic or silicon adhesives on a matrix material. Moreover, while length of these adhesive members is without particular limitation, to provide sufficient adhesive strength in the adhesive members to reliably link the adhesive tapes 10, 20 with the linking tape 30 as well as to facilitate handling when pasting, the adhesive members preferably have a length of 10 to 100 mm.

Adhesive Tape

The adhesive tapes 10, 20 are in the same configuration and have a three-layer structure having base films 11, 21 on which adhesive films 12, 22 and cover films 13, 23 are laminated in order. The adhesive tapes 10, 20 are longer than the linking tape 30 and length of each of the adhesive tapes 10, 20 may be the same or different. The adhesive tapes 10, 20, without particular limitation, preferably have a length of 10 to 1000 m to reduce the number of skips for the linking tape 30 and in consideration of maximum application length of application equipment of the adhesive tape 10, 20 when using the adhesive tape structure.

The base films 11, 21 are formed in a tape shape and are support films for supporting the adhesive films 12, 22. Examples of matrix materials for the base films 11, 21 are PET (Poly Ethylene Terephthalate), OPP (Oriented Polypropylene), PMP (Poly-4-methylpentene-1), and PTFE (Polytetrafluoroethylene), among others. Moreover, the base films 11, 21 are preferably release-treated, for example, with a silicone resin, on at least a surface on the side of the adhesive films 12, 22.

The base films 11, 21, without particular limitation, preferably have a thickness of 10 to 100 μm in order to ensure material strength and not increase winding diameter. Moreover, the base films 11, 21, without particular limitation, preferably have a width of 20 to 2000 μm in view of reliably covering a variety of electronic components.

Examples of the adhesive films 12, 22 include anisotropic conductive films (ACF: Anisotropic Conductive Film) and adhesive films (NCF: Non Conductive Film) for COG (Chip On Glass) mounting such as of electronic components to circuit boards as well as for FOG (Film On Glass) mounting for connecting circuit substrates together, among other applications, and electrically conducting adhesive films used for connecting solar cell electrodes to tab wires. As a binder for the adhesive films 12, 22, resins normally used in adhesive agents of connection-use tapes can be used, for example, epoxy resins, phenoxy resins, and urethane resins, among others.

The adhesive films 12, 22, without particular limitation, preferably have a thickness of 10 to 100 µm in view of reliably connecting terminals with varying heights of a variety of electronic components.

The cover films 13, 23 protect the adhesive films 12, 22 and are released when used. The same matrix materials as those used in the base films 11, 21 can be used in the cover films 13, 23. Moreover, the cover films 13, 23 are preferably release-treated, for example, with a silicone resin, on at least a surface on the side of the adhesive films 12, 22.

The cover films 13, 23, without particular limitation, preferably have a thickness of 10 to 100 µm in order to ensure material strength and not increase winding diameter.

Linking Tape

The linking tape 30 has a three-layer structure and has a linking matrix 31 on which an adhering film 32 and a release film 33 are laminated in this order. The linking tape 30 is shorter than the adhesive tapes 10, 20 and each linking tape 30 may have the same or different length. The linking tape 30, without particular limitation, preferably has a length of 50 to 1000 mm to enable sensing by a light sensor and avoid reducing production line conveyor speeds as much as possible.

The linking matrix 31 is formed into a tape shape and is a support film for supporting the adhering film 32. The same matrix materials as those used in the base films 11, 21 can be used in the linking matrix 31. Moreover, the linking matrix 31 can be made from non-transparent materials detectable by a light sensor, for example, a PET resin in which a black filler is dispersed. This enables a light sensor to detect the linking tape 30 so as to avoid half-cutting the linking tape 30 and control feeding of the adhesive tape structure in order to avoid pressing the linking tape 30 with the thermocompression head.

Thickness and width of the linking matrix 31, without particular limitation, are preferably equivalent to those of the adhesive tapes 10, 20 and the base films 11, 21 in view of smooth winding as well as withdrawing and feeding of the adhesive tape structure.

The adhering film 32 facilitates smooth release of the release film 33 and is not conventionally transferred to the target object but is a portion to be skipped. The composition of the matrix material used in the adhering film 32 can be of the same resins as used in the adhesive films 12, 22 of the adhesive tapes 10, 20, or different resins may be used. Moreover, in order to improve storage stability, a non-curing resin or pre-cured resin may be used.

Peel strength of the adhering film 32 and the release film 33 is preferably equivalent to peel strength of the adhesive films 12, 22 and the cover films 13, 23. This can prevent conveyor speed fluctuations in production lines when the release film 33 is released. Moreover, the adhering film 32, without particular limitation, preferably has a thickness equivalent to that of the adhesive films 12, 22.

The release film 33 protects the adhering film 32 and is released integrally with the cover films 13, 23 during use. The same matrix materials as those used in the cover films 13, 23 can be used in the release film 33.

The release film 33, without particular limitation, preferably has a thickness equivalent to that of the adhesive tape 10, 20 and the cover films 13, 23 in view of smooth winding as well as withdrawing and feeding of the adhesive tape structure.

3. Examples

An adhesive tape structure described in examples includes a plurality of adhesive tapes having a base film, an adhesive film, and a cover film laminated in this order, and a linking tape linking the adhesive tapes and configured such that the cover films of the plurality of adhesive tapes are integrally released, the adhesive tapes having at least a part of an edge portion removed from the adhesive film on a release initiation side in a cover film release direction.

Thus, in the adhesive tape structure, the second adhesive tape 20 illustrated in FIG. 2 has at least a part of an end portion of the adhesive film 22 on the linking tape 30 side removed. This can control protrusion in the edge portion of the adhesive film 22 on the release initiation side of the cover film 23. Moreover, this can suppress separation of the adhesive film 22 from the base film 21 during release of the cover film 23.

Furthermore, a method for manufacturing an adhesive tape structure described in examples includes a removing step of removing, from an adhesive tape raw sheet having a base film, an adhesive film, and a cover film laminated in this order, at least a part of an edge portion of the adhesive film on one side in a long direction of the adhesive tape raw sheet, a linking step of aligning edge portions of the adhesive film from which at least a part is removed and linking between adhesive tape raw sheets and a linking tape raw sheet such that cover films of a plurality of adhesive tape raw sheets are integrally released, a cutting step of cutting the linked adhesive tape raw sheets and linking raw sheet to a predetermined length, and a winding step of winding the cut adhesive tape and linking tape onto a reel such that the edge portion of the adhesive film having at least a part removed is on the release initiation side in the cover film release direction.

Below, a linking portion of an adhesive tape on a release initiation side in the cover film release direction will be explained; that is, an example structure of a release initiation side linking portion of an adhesive tape in which the second adhesive tape 20 and linking tape 30 are linked will be explained. In addition, a linking portion of an adhesive tape on a release termination side in the cover film release direction will be explained; that is, an example structure of a release termination side linking portion of an adhesive tape in which the first adhesive tape 10 and the linking tape 30 are linked will be explained. It should be noted that similar structures of the adhesive tape structure illustrated in FIG. 2 are denoted with the same signs and further explanation is omitted below.

Example 1

Figure 3:
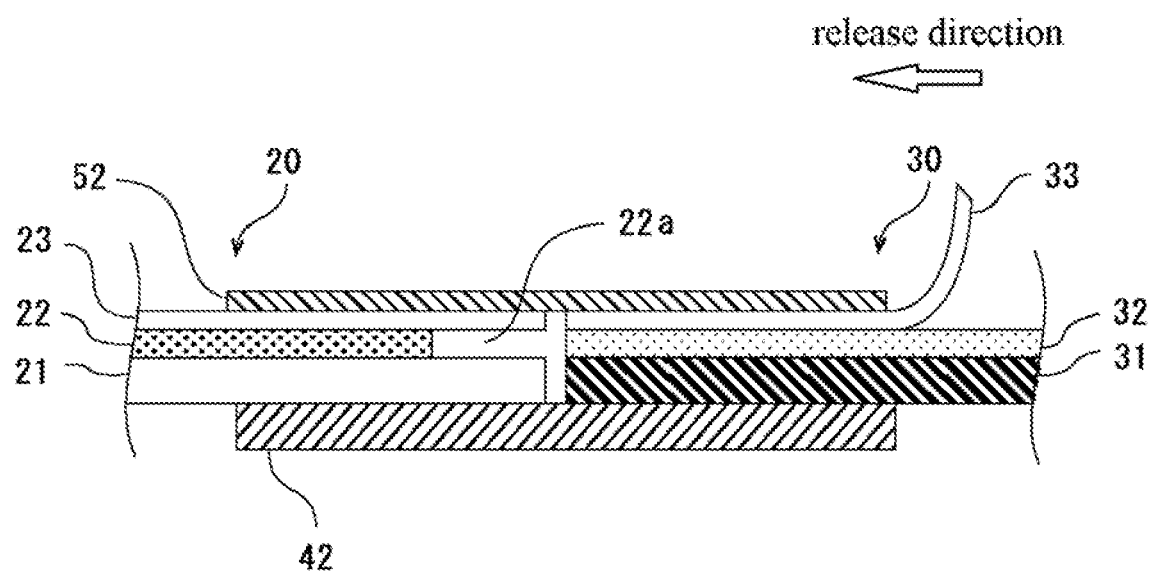
FIG. 3 is a cross-sectional view schematically illustrating a release initiation side linking portion of an adhesive tape of Example 1.

FIG. 3 is a cross-sectional view schematically illustrating a release initiation side linking portion of an adhesive tape of Example 1. An adhesive tape structure described in Example 1 includes an adhesive tape 20 having a base film 21, an adhesive film 22, and a cover film 23 laminated in this order, and a linking tape 30 linking the adhesive tape 20 configured such that the cover film 23 of the adhesive tape 20 is integrally released.

In the adhesive tape 20, an edge portion of the adhesive film 22 on a release initiation side in the cover film release direction is completely removed through a predetermined length from a tip of the cover film 23 in the release direction so that the adhesive tape 20 has a gap 22a in the edge portion of the adhesive film 22. Thus, a predetermined length from the tip of the cover film 23 is removed from the edge portion of the adhesive film 22 of the adhesive tape 20 on the release initiation side in the cover film release direction. Because insufficient length of the edge portion removed in the adhesive film 22, that is, insufficient length of the gap, hinders suppression of protrusion and excessive length would otherwise reduce usable portions of the adhesive film 22, the edge portion removed from the adhesive film 22 preferably has a length of 1 to 10 mm.

According to the adhesive tape structure described in Example 1, because the edge portion of the adhesive film 22 on the release initiation side in the cover film release direction is completely removed, protrusion of adhesive agent in the linking portion of the adhesive tape on the release initiation side in the cover film release direction can be suppressed. Moreover, separation of the adhesive film 22 from the base film 21 when releasing the cover film 23 can be suppressed.

The adhesive tape structure described in Example 1 can be obtained by, in the removing step described above, completely removing a part having a predetermined length from an edge portion of the adhesive film from the tip of the cover film on one side in the long direction of an adhesive tape raw sheet.

It should be noted that, in Example 1, while a release initiation side linking portion of an adhesive tape was described, a release termination side linking portion of an adhesive tape may be similarly configured. Thus, an edge portion of the adhesive film on the release termination side in the cover film release direction may be removed in the direction opposite to the release direction from the tip of the cover film. This can suppress protrusion of adhesive agent in the linking portion of the adhesive tape on the release termination side in the cover film release direction.

Example 2

Figure 4:
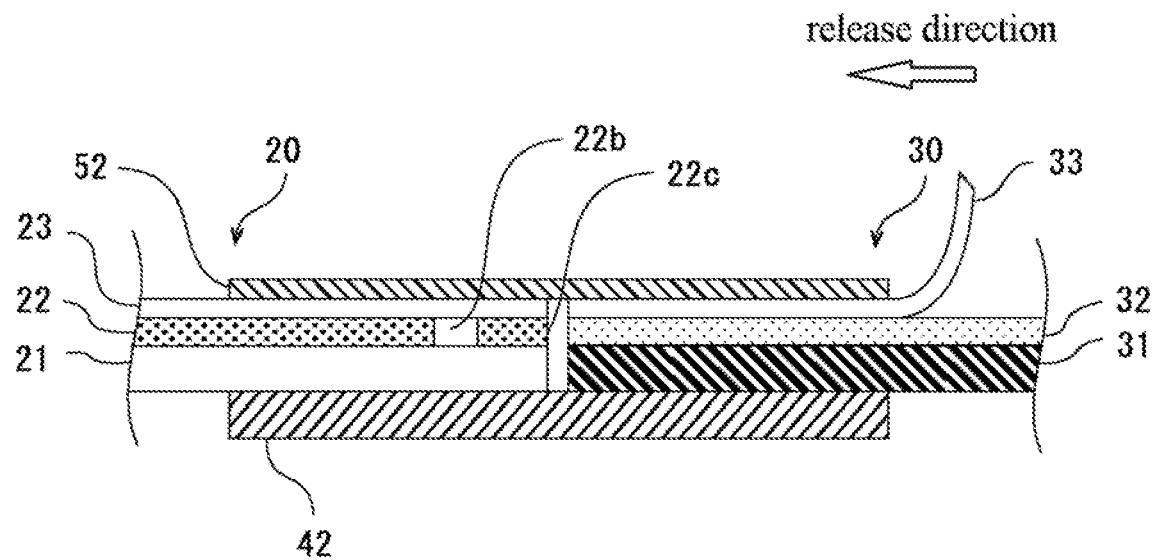
FIG. 4 is a cross-sectional view schematically illustrating a release initiation side linking portion of an adhesive tape of example 2.

FIG. 4 is a cross-sectional view schematically illustrating a release initiation side linking portion of an adhesive tape of Example 2. An adhesive tape structure described in Example 2 includes, as in Example 2, an adhesive tape 20 and a linking tape 30.

In the adhesive tape 20, a part of an edge portion of the adhesive film 22 on a release initiation side in the cover film release direction is removed so that the adhesive tape 20 has a gap 22b in the edge portion of the adhesive film 22. Thus, in the adhesive tape 20, an edge portion of the adhesive film 22 on the release initiation side in the cover film release direction has an adhesive agent portion 22c extending a predetermined length in the release direction from a tip of the cover film 23 followed by a gap 22b having a predetermined length. Because insufficient length of the gap 22b cannot achieve blocking suppression effects and excessive length reduces usable portions of the adhesive film 22, the gap 22b preferably has a length of 1 to 10 mm.

According to the adhesive tape structure described in Example 2, because the edge portion of the adhesive film 22 on the release initiation side in the release direction of the cover film 23 is partially removed, protrusion of adhesive agent in the linking portion of the adhesive tape on the release initiation side in the cover film release direction can be suppressed. Moreover, for example, even in the case of protrusion occurring in the adhesive agent portion 22c, by having the gap 22b, when the cover film 23 is released, only the adhesive agent 22c detaches from the base film 21 and separation of the adhesive film 22 from the base film 21 in the release direction can be suppressed.

The adhesive tape structure described in Example 2 can be obtained by, in the removing step described above, removing a part of an edge portion of the adhesive film on one side in the long direction of an adhesive tape raw sheet but leaving a predetermined length from a tip of the cover film.

It should be noted that, in Example 2, while a release initiation side linking portion of an adhesive tape was described, a release termination side linking portion of an adhesive tape may be similarly configured. Thus, an edge portion on the release termination side in the cover film release direction may have an adhesive agent portion extending a predetermined length in the direction opposite to the release direction from a tip of the cover film and may have a gap having a predetermined length following the adhesive agent portion. This can suppress protrusion of adhesive agent in the linking portion of the adhesive tape on the release termination side in the cover film release direction.

Example 3

Figure 5:
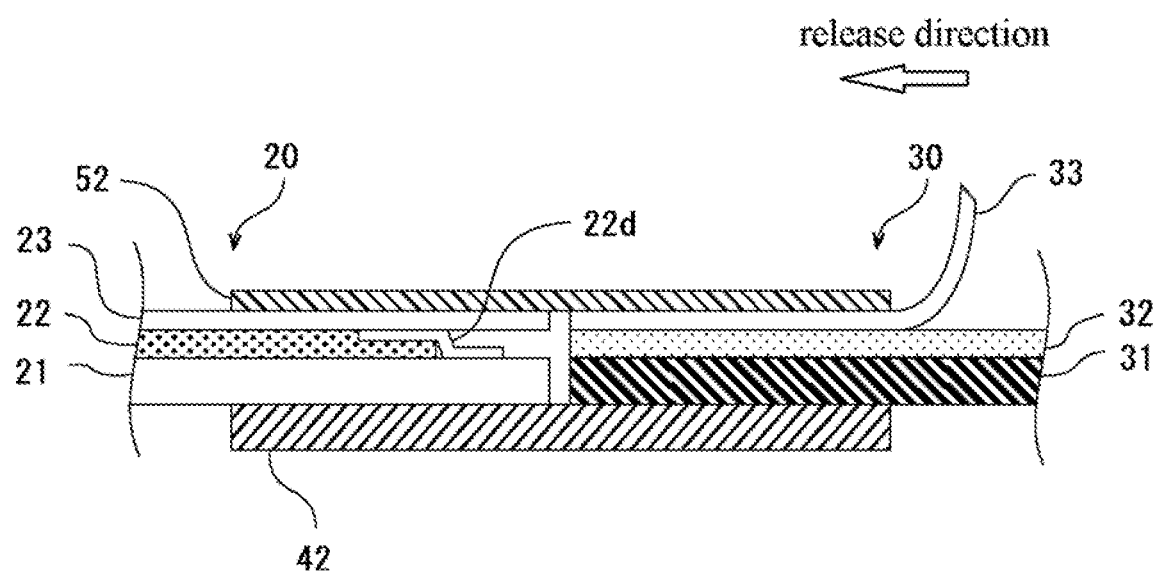
FIG. 5 is a cross-sectional view schematically illustrating a release initiation side linking portion of an adhesive tape of Example 3.

FIG. 5 is a cross-sectional view schematically illustrating a release initiation side linking portion of an adhesive tape of Example 3. An adhesive tape structure described as Example 3 includes, as in Example 1, an adhesive tape 20 and a linking tape 30.

In the adhesive tape 20, an edge portion of the adhesive film 22 on the release initiation side in the release direction of the cover film 23 is completely removed and the edge portion of the adhesive film 22 is secured with a one-sided adhesive tape 22d to the base film.

According to the adhesive tape structure described in Example 3, because the edge portion of the adhesive film 22 on the release initiation side in the release direction of the cover film 23 is removed, and because the adhesive film 22 is secured with the one-sided adhesive tape 22d to the base film, protrusion of adhesive agent in the linking portion of the adhesive tape on the release initiation side in the cover film release direction can be suppressed. Furthermore, separation of the adhesive film 22 from the base film 21 during release of the cover film 23 can be reliably prevented.

The adhesive tape structure described in Example 3 can be obtained by, in the removing step described above, completely removing a predetermined length of an edge portion of the adhesive film from the tip of the cover film on one side in a long direction of an adhesive tape raw sheet and securing the edge portion of the adhesive film with a one-sided adhesive tape to the base film.

It should be noted that, in Example 3, while a release initiation side linking portion of an adhesive tape was described, a release termination side linking portion of an adhesive tape may be similarly configured. Thus, an edge portion of the adhesive film on the release termination side in the cover film release direction is completely removed and the edge portion of the adhesive film is secured by a one-sided adhesive tape to the base film. This suppresses protrusion of adhesive agent in the linking portion of the adhesive tape on the release termination side in the cover film release direction.

Example 4

Figure 6:
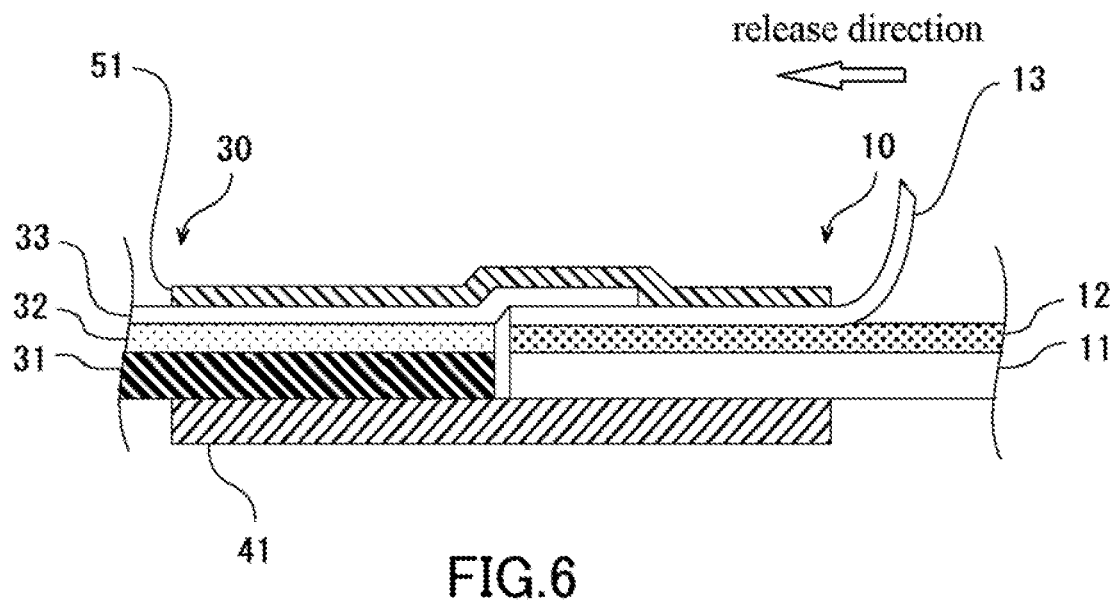
FIG. 6 is a cross-sectional view schematically illustrating a release termination side linking portion of an adhesive tape of Example 4.

FIG. 6 is a cross-sectional view schematically illustrating a release termination side linking portion of an adhesive tape of Example 4. An adhesive tape structure as described in Example 4 includes an adhesive tape 10 having a base film 11, an adhesive film 12, and a cover film 13 laminated in this order, and a linking tape 30 having a linking matrix 31, an adhering film 32, and a release film 33 laminated in this order, linked to the adhesive tape 10.

In the linking tape 30, an edge portion of the release film 33 on an initiation side in the cover film release direction extends over the cover film 13 of the adhesive tape 10, and the adhesive tape 10 and the cover film 13 are configured to be integrally released. In particular, a first cover side adhesive member 51 is applied across the extended edge portion of the release film 33 and the cover film 13. Because both insufficient and excessive length for the extended edge portion of the release film 33 hinder easy release, the extended portion of the release film 33 preferably has a length of 2 to 20 mm.

According to the adhesive tape structure described in Example 4, because the edge portion of the release film 33 on the release initiation side in the cover film release direction extends over the cover film 13 of the adhesive tape 10, even in the case of protrusion occurring in an edge portion of a release termination side in the adhesive tape, a strong peeling force is enabled during release of the cover film 13 so that blocking can be suppressed.

An adhesive tape structure described in Example 4 can be obtained by removing a part of an edge portion of one side of an adhering film of a linking tape raw sheet, and in the linking step described above, by overlapping and linking the release film in which the edge portion of the adhering film is removed above the cover film of the adhesive tape raw sheet.

It should be noted that, in Example 4, at least a part of an edge portion of the adhesive film on the release termination side in the cover film release direction may be removed. This can suppress protrusion of adhesive agent in the linking portion of the adhesive tape on the release termination side in the cover film release direction. Moreover, in Example 4, while a release termination side linking portion of an adhesive tape was described, a release initiation side linking portion of an adhesive tape may be similarly configured. Thus, in the adhesive tape, an edge portion of the cover film on the release initiation side in the cover film release direction may extend over the release film of the linking tape so that the cover film of the adhesive tape is integrally released. This can prevent blocking in the linking portion of the adhesive tape on the release initiation side in the cover film release direction.

Example 5

Figure 7:
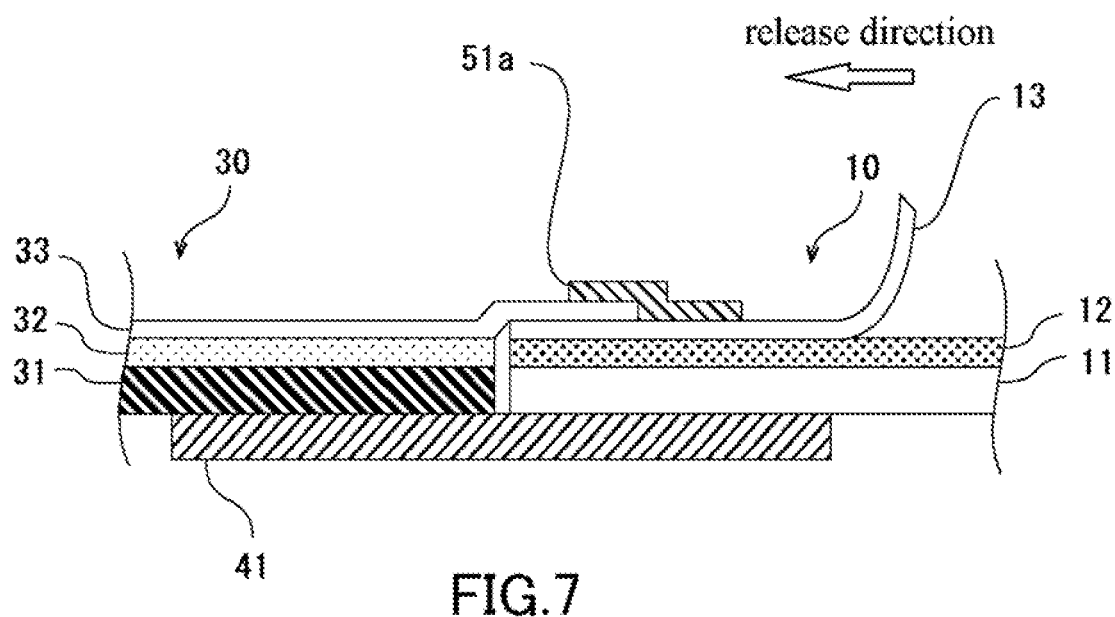
FIG. 7 is a cross-sectional view schematically illustrating a release termination side linking portion of an adhesive tape of Example 5.

FIG. 7 is a cross-sectional view schematically illustrating a release termination side linking portion of an adhesive tape of Example 5. An adhesive tape structure described in Example 5, as in Example 4, includes an adhesive tape 10 and a linking tape 30.

In the linking tape 30, an edge portion of the release film 33 on a release initiation side in the cover film release direction extends over the cover film 13 of the adhesive tape 10, and an edge portion of the release film 33 is secured by a first cover side adhesive member 51a on the cover film 13. The first cover side adhesive member 51a is applied across the edge portion of the release film 33 and the cover film 13, and an edge portion of the first cover side adhesive member 51a on the release termination side in the cover film release direction is situated above an overlapping portion of the release film 33 cover film 13.

According to the adhesive tape structure described in Example 5, because the edge portion of the release film 33 on the release initiation side in the cover film release direction extends over the cover film 13 of the adhesive tape 10, even in the case of protrusion occurring in the release termination side of the adhesive tape, a strong peeling force is enabled during release of the cover film 13 and blocking can be suppressed. Moreover, because the edge portion on the release termination side in the cover film release direction of the first cover side adhesive member 51a is located on the overlapping portion of the release film 33 and the cover film 13, protrusion at the release termination side of the adhesive tape 10 can be suppressed.

The adhesive tape structure described in Example 5 can be obtained by removing an edge portion of an adhering film on one side of a linking tape raw sheet, and in the linking step described above, overlapping the edge portion of the release film from which the adhering film was removed above the cover film of an adhesive tape raw sheet and securing the edge portion with the raw sheet of the first cover side adhesive member.

It should be noted that, in Example 5, at least a part of an edge portion of the adhesive film on the release termination side in the cover film release direction may be removed. This can suppress protrusion of adhesive agent in the linking portion of the adhesive tape on the release termination side in the cover film release direction. Moreover, in Example 5, while a release termination side linking portion of an adhesive tape was described, a release initiation side linking portion of an adhesive tape may be similarly configured. Thus, in the adhesive tape, an edge portion of the cover film on the release initiation side in the cover film release direction may extend over the release film of the linking tape and an edge portion of the cover film may be secured by the first cover side adhesive member above the release film. This can prevent blocking in the linking portion of the adhesive tape on the release initiation side in the cover film release direction.

Example 6

Figure 8:
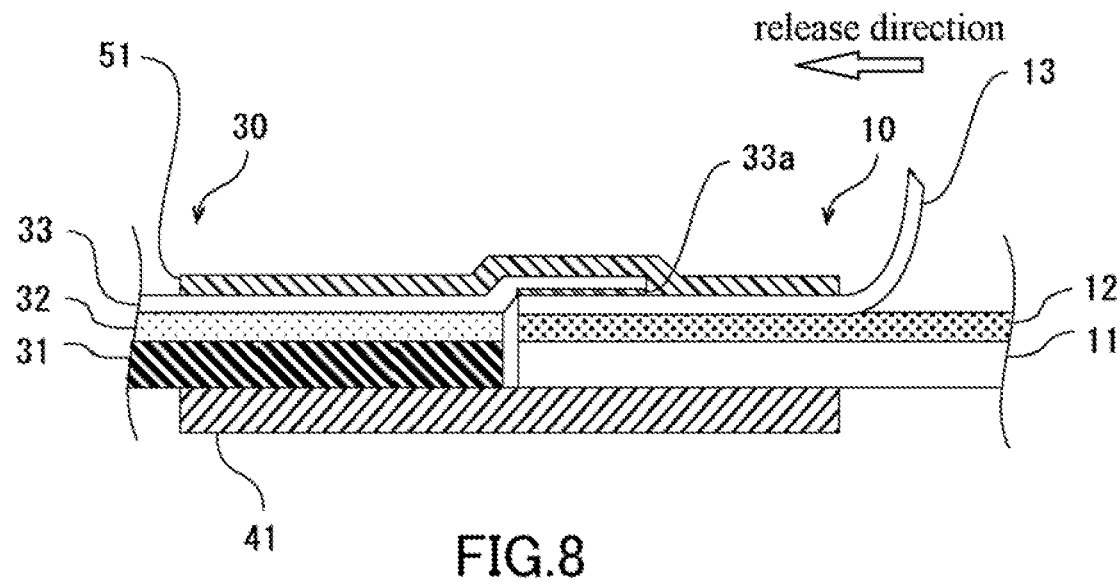
FIG. 8 is a cross-sectional view schematically illustrating a release termination side linking portion of an adhesive tape of Example 6.

FIG. 8 is a cross-sectional view schematically illustrating a release termination side linking portion of an adhesive tape of Example 6. An adhesive tape structure described in Example 6, as in Example 4, includes an adhesive tape 10 and a linking tape 30.

In the linking tape 30, an edge portion of the release film 33 on a release initiation side in the cover film release direction extends over the cover film 13 of the adhesive tape 10 and is configured so as to be released integrally with the cover film 13 of the adhesive tape 10. In particular, the release film 33 and the cover film 13 overlap at an overlapping portion and are pasted together by a double-sided adhesive tape 33a, and a first cover side adhesive member 51 is applied across an edge portion of the release film 33 and the cover film 13.

According to the adhesive tape structure described in Example 6, because the edge portion of the release film 33 on the release initiation side in the cover film release direction extends over the cover film 13 of the adhesive tape 10, even in the case of protrusion occurring in the edge portion of the release termination side of the adhesive tape, a strong peeling force is enabled during release of the cover film 13 and blocking can be suppressed. Moreover, because the release film 33 and the cover film 13 are pasted together with the double-sided adhesive tape 33a at the overlapping portion, when the adhesive tape bends around a roller of an application apparatus, the release film 33 can be prevented from lifting off of the cover film 13 at the overlapping portion of the release film 33 and the cover film 13.

The adhesive tape structure described in Example 6 can be obtained by removing an edge portion of an adhering film of one side of a linking tape raw sheet, and in the linking step described above, by overlapping the release film on the edge portion in which the adhering film is removed above the cover film of the adhesive tape raw sheet and pasting together with a raw sheet of a double-sided adhesive tape.

It should be noted that, in Example 6, at least a part of an edge portion of the adhesive film on the release termination side in the cover film release direction may be removed. This can suppress protrusion of adhesive agent in the linking portion of the adhesive tape on the release termination side in the cover film release direction. Moreover, in Example 6, while a release termination side linking portion of an adhesive tape was described, a release initiation side linking portion of an adhesive tape may be similarly configured. Thus, in the adhesive tape, an edge portion of the cover film on the release initiation side in the cover film release direction may extend over the release film of the linking tape, the cover film and release film may be pasted together at the overlapping portion by a double-sided tape, and a second cover side adhesive member may be applied across the edge portion of the cover film and the release film. This can prevent blocking in the linking portion of the adhesive tape on the release initiation side in the cover film release direction.

Example 7

Figure 9:
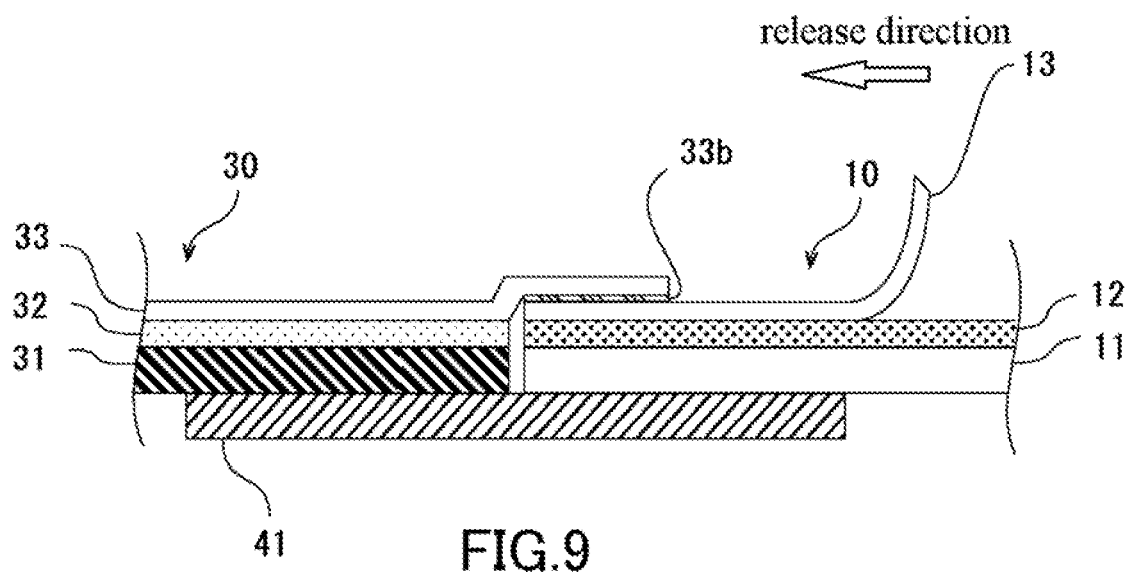
FIG. 9 is a cross-sectional view schematically illustrating a release termination side linking portion of an adhesive tape of Example 7.

FIG. 9 is a cross-sectional view schematically illustrating a release termination side linking portion of an adhesive tape of Example 7. The adhesive tape structure described in Example 7, as in Example 4, includes an adhesive tape 10 and a linking tape 30.

In the linking tape 30, an edge portion of the release film 33 on a release initiation side in the cover film release direction extends over the cover film 13 of the adhesive tape 10 and be released integrally with the cover film 13 of the adhesive tape 10. In particular, the release film 33 and the cover film 13 are pasted together at an overlapping portion by a double-sided tape 33b.

According to the adhesive tape structure described in Example 7, because an edge portion of the release film 33 on the release initiation side in the release direction extends over the cover film 13 of the adhesive tape 10, even in the case of protrusion occurring in the edge portion on the release termination side of the adhesive tape, a strong peeling force is enabled during release of the cover film 13 so that blocking can be suppressed. Moreover, when the adhesive tape structure bends around a roller of an application apparatus, the release film 33 can be prevented from lifting off of the cover film 13 at the overlapping portion of the release film 33 and the cover film 13. Furthermore, by using a double-sided tape with strong adhesiveness, it is possible to omit a first cover side adhesive member which would otherwise be applied across the edge portion of the release film 33 and the cover film 13.

The adhesive tape structure described in Example 7, as in Example 6, can be obtained by removing an edge portion of an adhering film on one side of a linking tape raw sheet, and, in the linking step described above, by overlapping the release film on the edge portion in which the adhering film is removed above the cover film of the adhesive tape raw sheet and pasting together with a raw sheet of a double-sided adhesive tape.

It should be noted that, in Example 7, at least a part of an edge portion of the adhesive film on the release termination side in the cover film release direction may be removed. This can suppress protrusion of adhesive agent in the linking portion of the adhesive tape on the release termination side in the cover film release direction. Moreover, in Example 7, while a release termination side linking portion of an adhesive tape was described, a release initiation side linking portion of an adhesive tape may be similarly configured. Thus, in the adhesive tape, an edge portion of the cover film on the release initiation side in the cover film release direction may extend over the release film of the linking tape, and the cover film and the release film may be pasted together at an overlapping portion by the double-sided tape. This can suppress blocking in the linking portion of the adhesive tape on the release initiation side in the cover film release direction.

Example 8

Figure 10:
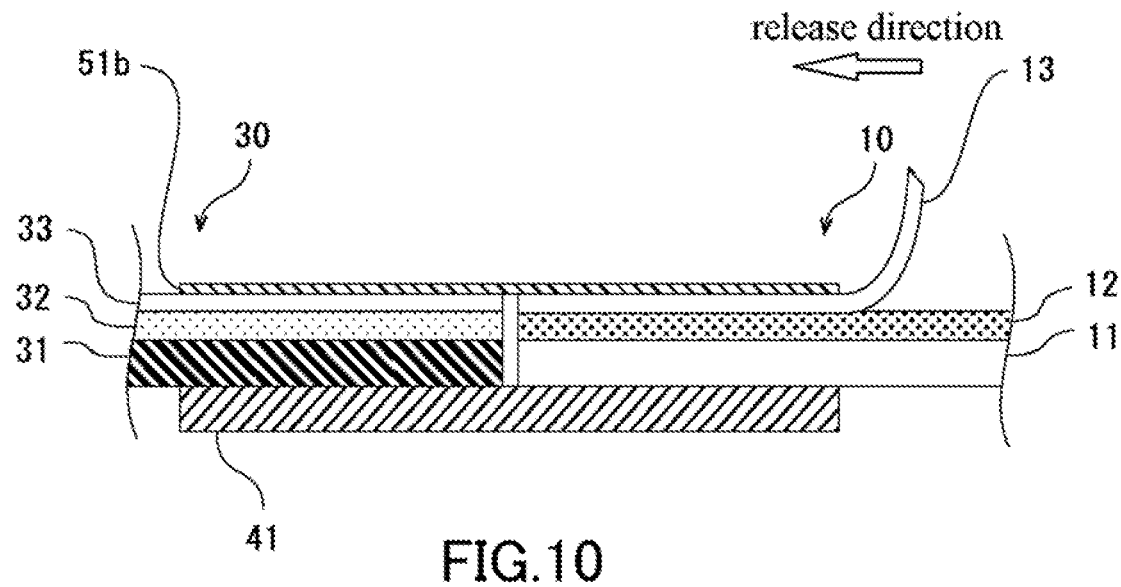
FIG. 10 is a cross-sectional view schematically illustrating a release termination side linking portion of an adhesive tape of Example 8.

FIG. 10 is a cross-sectional view schematically illustrating a release termination side linking portion of an adhesive tape of Example 8. An adhesive tape structure described in Example 8 includes an adhesive tape 10 having a base film 11, an adhesive film 12, and a cover film 13 laminated in this order, and a linking tape 30 having a linking matrix 31, an adhering film 32, and a release film 33 laminated in this order, linked to the adhesive tape 10.

Furthermore, the adhesive tape structure includes a first base side adhesive member 41 connecting an edge portion of the base film 11 of a first adhesive tape 10 and an edge portion of the linking matrix 31 of the linking tape 30 as well as a first cover side adhesive member 51b connecting an edge portion of the base film 13 of the first adhesive tape 10 and an edge portion of the release film 33 of the linking tape 30.

Thickness of the first cover side adhesive member 51b is less than that of the first base side adhesive member 41. In particular, the first cover side adhesive member 51b preferably has a thickness of 5 to 20 mm.

According to the adhesive tape structure described in Example 8, because the first cover side adhesive member 51b is thin, stress is reduced in the adhesive tape structure when bending around a roller of an application apparatus and the cover film 13 can be prevented from peeling away from the adhesive film 12.

The adhesive tape structure described in Example 8 can be obtained by, in the linking step described above, using a raw sheet of a first cover side adhesive member having a thickness that is less than a thickness of a first base side adhesive member to connect an edge portion of a cover film of an adhesive tape raw sheet and an edge portion of a release film of a linking tape raw sheet.

It should be noted that, in Example 8, while a release termination side linking portion of an adhesive tape was described, a release initiation side linking portion of an adhesive tape may be similarly configured. Thus, in Examples 1 to 3, the second cover side adhesive member 52 can have a thickness that is less than that of the second base side adhesive member 42. This reduces stress in the adhesive tape structure when bending around a roller of an application apparatus and can suppress separation of the cover film 23 from the adhesive film 22. Moreover, in Example 8, at least a part of an edge portion of the adhesive film on the release termination side in the cover film release direction may be removed. This can suppress protrusion of adhesive agent in the linking portion of the adhesive tape on the release termination side in the cover film release direction.

Example 9

Figure 11:
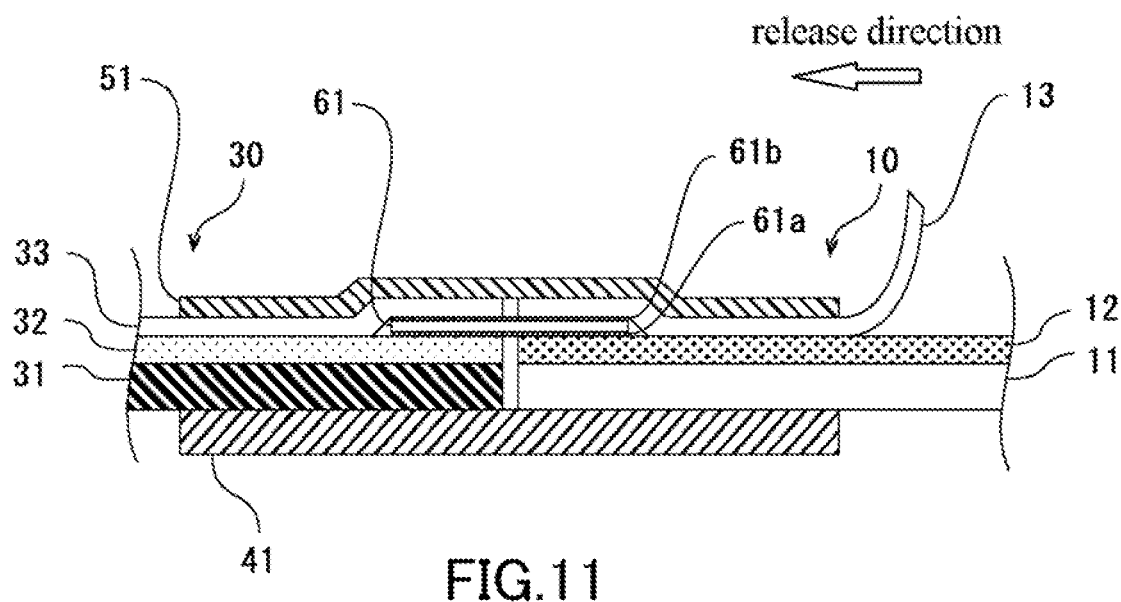
FIG. 11 is a cross-sectional view schematically illustrating a release termination side linking portion of an adhesive tape of Example 9.

FIG. 11 is a cross-sectional view schematically illustrating a release termination side linking portion of an adhesive tape of Example 9. An adhesive tape structure described in Example 9 includes an adhesive tape 10 having a base film 11, an adhesive film 12, and a cover film 13 laminated in this order, and a linking tape 30 having a linking matrix 31, an adhering film 32, and a release film 33 laminated in this order, linked to the adhesive tape 10.

Furthermore, the adhesive tape structure includes a double-sided tape 61 inserted between the adhesive film 12 and the cover film 13 on an edge portion of the adhesive tape 10 on the release termination side in the cover film release direction as well as between the adhering film 32 and the release film 33 on an edge portion of the linking tape 30 on the release initiation side in the cover film release direction.

The double-sided tape 61 connects an edge portion of the adhesive film 12 on the release termination side in the cover film release direction and an edge portion of the adhering film 32 on the release initiation side in the cover film release direction at a first bonding surface 61a and also connects an edge portion of the cover film 13 on the release termination side in the cover film release direction and an edge portion of the release film 33 on the release initiation side in the cover film release direction at a second bonding surface 61b.

According to the adhesive tape structure described in Example 9, because the double-sided tape 61 bonds between the adhesive film 12 and the cover film 13 on the edge portion of the adhesive tape 10 on the release termination side in the cover film release direction as well as between the adhering film 32 and the release film 33 on the edge portion of the linking tape 30 on the release initiation side in the cover film release direction, even in the case of stress being applied when the adhesive tape structure bends around a roller of an application apparatus, separation of the cover film 13 from the adhesive film 12 can be suppressed.

The adhesive tape structure described in Example 9 can be obtained by, in the linking step described above, inserting a double-sided tape to connect between an adhesive film and a cover film on an edge portion of an adhesive tape raw sheet as well as between an adhering film and a release film on an edge portion of a linking tape raw sheet.

Example 10

Figure 12:
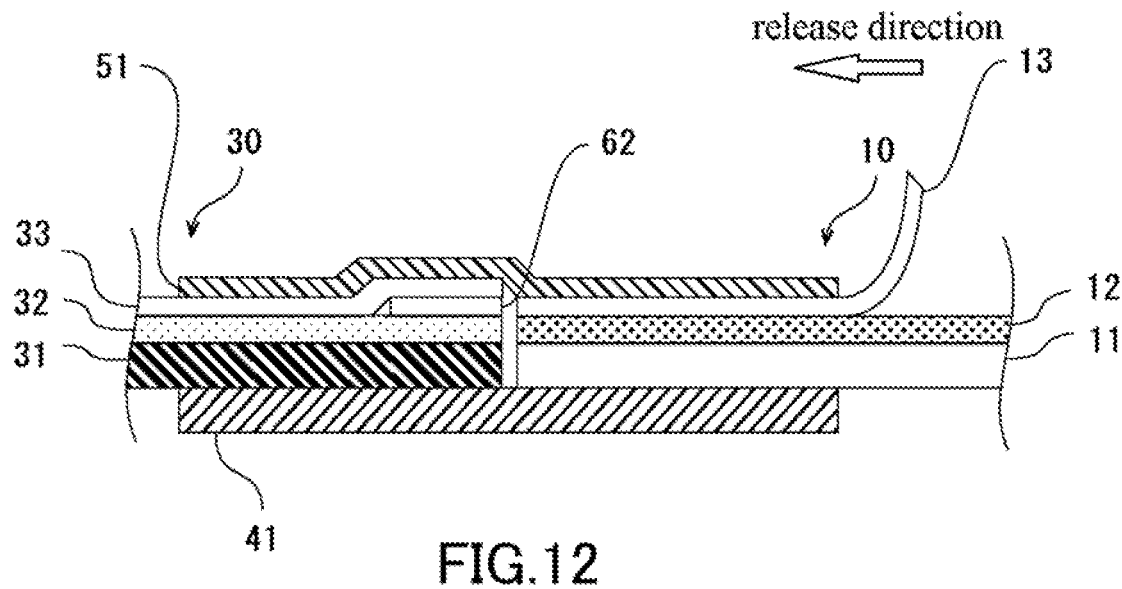
FIG. 12 is a cross-sectional view schematically illustrating a release termination side linking portion of an adhesive tape of Example 10.

FIG. 12 is a cross-sectional view schematically illustrating a release termination side linking portion of an adhesive tape of Example 10. The adhesive tape structure described in Example 10 includes, as in Example 9, an adhesive tape 10 and a linking tape 30.

The linking tape 30 has a double-sided tape 62 inserted between an adhering film 32 and a release film 33 on an edge portion on a release initiation side in the cover film release direction. The double-sided tape 62 bonds the adhering film 32 and the release film 33 on the edge portion on the release initiation side in the cover film release direction.

According to the adhesive tape structure described in Example 10, because the double-sided tape 62 bonds between the adhering film 32 and the release film 33 on an edge portion of the linking tape 30 on the release initiation side in the cover film release direction, even in the case of stress being applied when the adhesive tape structure bends around a roller of an application apparatus, separation of the cover film 13 from the adhesive film 12 can be suppressed.

The adhesive tape structure described in Example 10 can be obtained by, in the linking step described above, inserting the double-sided tape between the adhering film and the release film on an edge portion of a linking tape raw sheet before linking an adhesive tape raw sheet with a linking tape raw sheet.

Example 11

Figure 13:
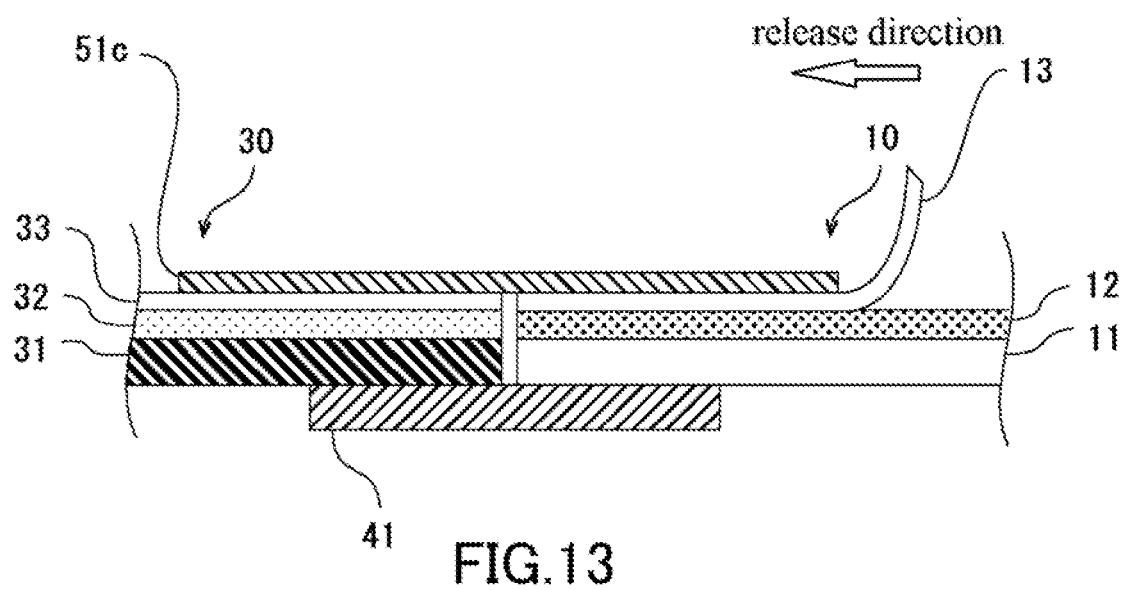
FIG. 13 is a cross-sectional view schematically illustrating a release termination side linking portion of an adhesive tape of Example 11.

FIG. 13 is a cross-sectional view schematically illustrating a release termination side linking portion of an adhesive tape of Example 11. An adhesive tape structure described in Example 11 includes an adhesive tape 10 having a base film 11, an adhesive film 12, and a cover film 13 laminated in this order, and a linking tape 30 having a linking matrix 31, an adhering film 32, and a release film 33 laminated in this order, linked to the adhesive tape 10.

Furthermore, the adhesive tape structure includes a first base side adhesive member 41 connecting an edge portion of the base film 11 of a first adhesive tape 10 of a first adhesive tape 10 and an edge portion of the linking matrix 31 of the linking tape 30 as well as a first cover side adhesive member 51c connecting an edge portion of the cover film 13 of the first adhesive tape 10 and an edge portion of the release film 33 of the linking tape 30. Herein, the first cover side adhesive member 51c is longer than a first base side adhesive member 41.

According to the adhesive tape structure described in Example 11, because the length of the first cover side adhesive member 51c is greater than the length of the first base side adhesive member 41, stress applied when the adhesive tape structure bends around a roller of an application apparatus can be reduced and separation of the cover film 13 from the adhesive film 12 can be suppressed.

The adhesive tape structure described in Example 11 can be obtained by, in the linking step described above, using a raw sheet of a first cover side adhesive member that is longer than a first base side adhesive member to connect an edge portion of a cover film of an adhesive tape raw sheet and an edge portion of a release film of a linking tape raw sheet.

It should be noted that, in Example 11, while a release termination side linking portion of an adhesive tape was described, a release initiation side linking portion of an adhesive tape may be similarly configured. Thus, in Examples 1 to 3, the second cover side adhesive member 52 can have a thickness that is less than that of the second base side adhesive member 42. This reduces stress in the adhesive tape structure when bending around a roller of an application apparatus and can suppress separation of the cover film 23 from the adhesive film 22. Moreover, in Example 11, at least a part of an edge portion of the adhesive film on the release termination side in the cover film release direction may be removed. This can suppress protrusion of adhesive agent in the linking portion of the adhesive tape on the release termination side in the cover film release direction.

Example 12

Figure 14:
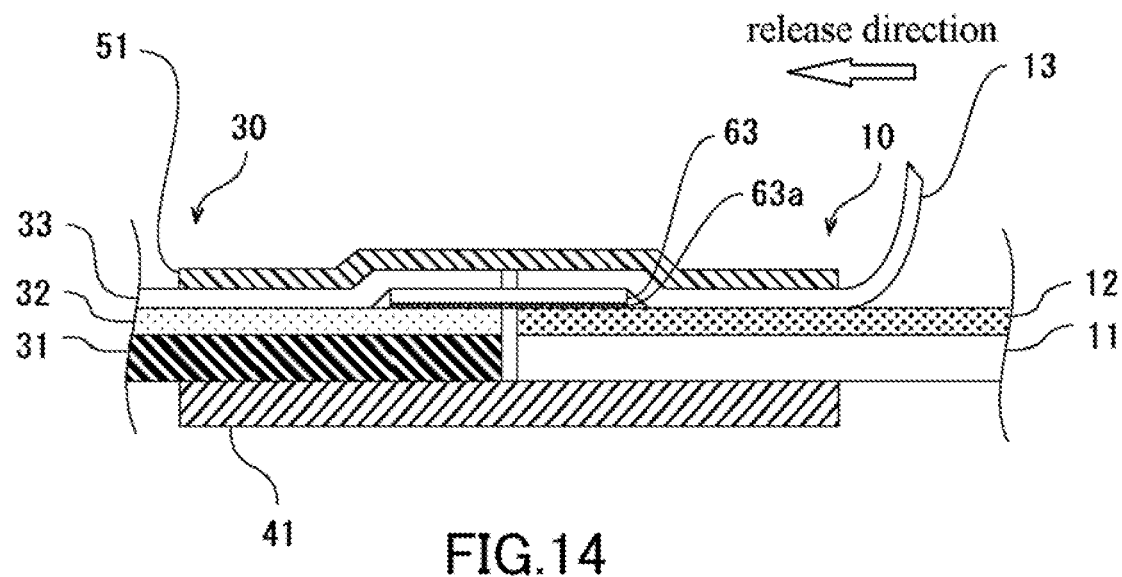
FIG. 14 is a cross-sectional view schematically illustrating a release termination side linking portion of an adhesive tape of Example 12.

FIG. 14 is a cross-sectional view schematically illustrating a release termination side linking portion of an adhesive tape of Example 12. The adhesive tape structure described in Example 12 includes an adhesive tape 10 having a base film 11, an adhesive film 12, and a cover film 13 laminated in this order, and a linking tape 30 having a linking matrix 31, an adhering film 32, and a release film 33 laminated in this order, linked to the adhesive tape 10.

Furthermore, the adhesive tape structure includes a one-sided adhesive tape 63 inserted between the adhesive film 12 and the cover film 13 on an edge portion of the adhesive tape 10 on a release termination side in the cover film release direction as well as between the adhering film 32 and the release film 33 on an edge portion of the linking tape 30 on the release initiation side in the cover film release direction.

The one-sided adhesive tape 63 connects an edge portion of the adhesive film 12 on a release termination side in the cover film release direction and an edge portion of the adhering film 32 on the release initiation side in the cover film release direction at a bonding surface 63. Moreover, the surface opposite the bonding surface 63a is preferably release-treated.

According to the adhesive tape structure described in Example 12, due to easy release between the one-sided adhesive tape 63 and the cover film 13, in the edge portion of the adhesive tape 10 on the release termination side in the cover film release direction, blocking caused by protrusion of adhesive agent from the adhesive film 12 can be suppressed.

The adhesive tape structure described in Example 12 can be obtained by, in the linking step described above, inserting a one-sided adhesive tape to connect between an adhesive film and a cover film on an edge portion of an adhesive tape raw sheet as well as between an adhering film and a release film on an edge portion of a linking tape raw sheet.

Example 13

Figure 15:
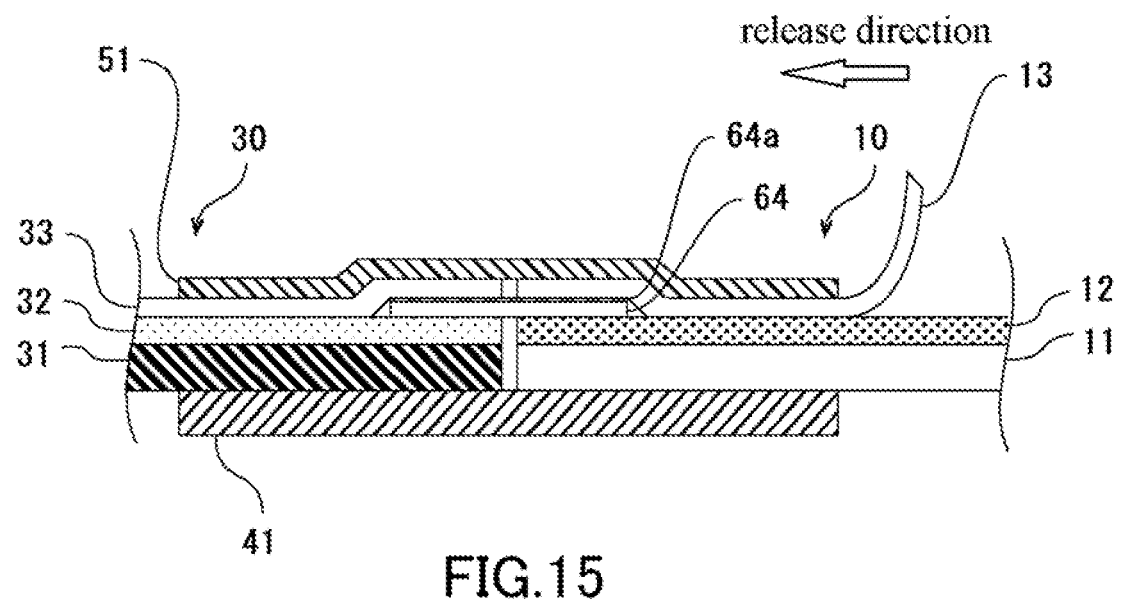
FIG. 15 is a cross-sectional view schematically illustrating a release termination side linking portion of an adhesive tape of Example 13.

FIG. 15 is a cross-sectional view schematically illustrating a release termination side linking portion of an adhesive tape of Example 13. An adhesive tape structure described in Example 13 includes, as in Example 12, an adhesive tape 10 and a linking tape 30.

Furthermore, the adhesive tape structure includes a one-sided adhesive tape 64 inserted between the adhesive film 12 and the cover film 13 on an edge portion of the adhesive tape 10 on a release termination side in the cover film release direction as well as between the adhering film 32 and the release film 33 on an edge portion of the linking tape 30 on the release initiation side in the cover film release direction.

The one-sided adhesive tape 64 connects an edge portion of the cover film 13 on the release termination side in the cover film release direction and an edge portion of the release film 33 on the release initiation side in the cover film release direction at a bonding surface 64a. Moreover, the surface opposite the bonding surface 64a is preferably release-treated.

According to the adhesive tape structure described in Example 13, due to easy release between the one-sided adhesive tape 64 and the adhesive film 12, in the edge portion of the of the adhesive tape 10 on the release termination side in the cover film release direction, blocking caused by protrusion of adhesive agent from the adhesive film 12 can be suppressed.

The adhesive tape structure described in Example 13 can be obtained by, in the linking step described above, inserting a one-sided adhesive tape to connect between an adhesive film and a cover film on an edge portion of an adhesive tape raw sheet as well as between an adhering film and a release film on an edge portion of a linking tape raw sheet.

Example 14

Figure 16:
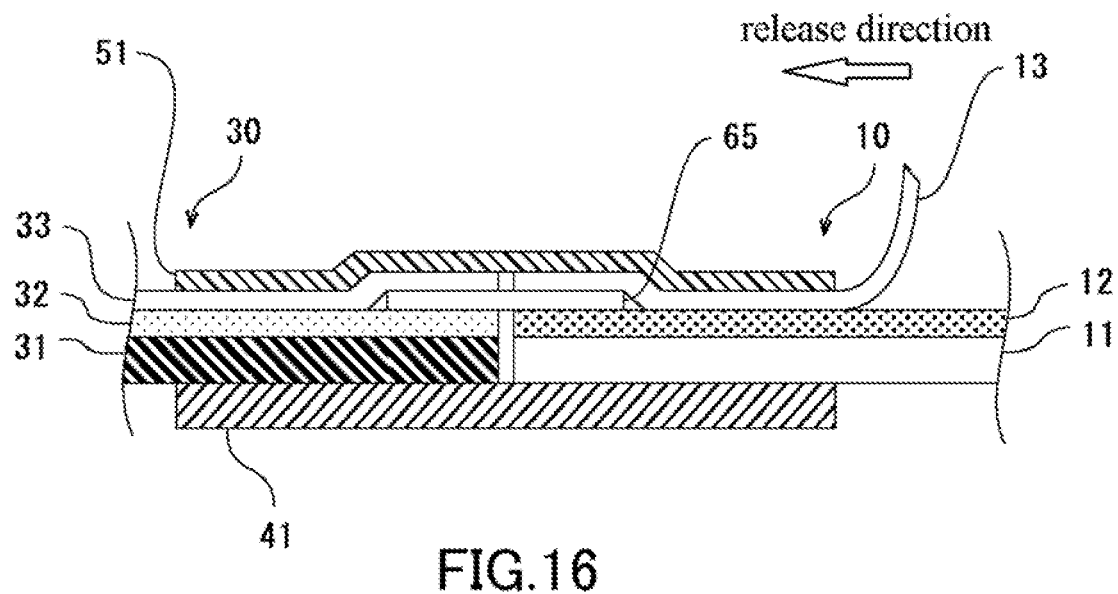
FIG. 16 is a cross-sectional view schematically illustrating a release termination side linking portion of an adhesive tape of Example 14.

FIG. 16 is a cross-sectional view schematically illustrating a release termination side linking portion of an adhesive tape of Example 14. An adhesive tape structure described in Example 14 includes, as in Example 12, an adhesive tape 10 and a linking tape 30.

Furthermore, the adhesive tape structure includes a double-sided release tape 65 release-treated on both surfaces and inserted between the adhesive film 12 and the cover film 13 on an edge portion of the adhesive tape 10 on a release termination side in the cover film release direction as well as between the adhering film 32 and the release film 33 on an edge portion of the linking tape 30 on an initiation side in the cover film release direction.

According to the adhesive tape structure described in Example 14, due to easy release between the double-sided release tape 65 and the adhesive film 12 as well as between the double-sided release tape 65 and the cover film 13, in the edge portion of the adhesive tape 10 on the release termination side in the cover film release direction, blocking caused by protrusion of adhesive agent from the adhesive film 12 can be suppressed.

The adhesive tape structure described in Example 14 can be obtained by, in the linking step described above, inserting a double-sided release tape to connect between an adhesive film and a cover film on an edge portion of an adhesive tape raw sheet as well as between an adhering film and a release film on an edge portion of a linking tape raw sheet.

Example 15

Figure 17:
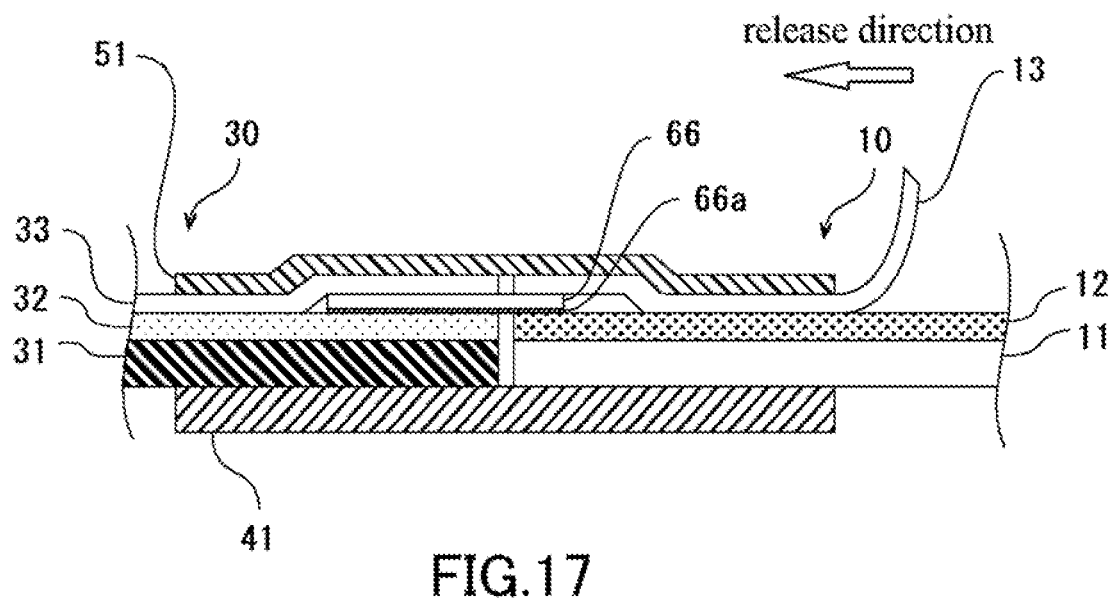
FIG. 17 is a cross-sectional view schematically illustrating a release termination side linking portion of an adhesive tape of Example 15.

FIG. 17 is a cross-sectional view schematically illustrating a release termination side linking portion of an adhesive tape of Example 15. An adhesive tape structure described in Example 15 includes an adhesive tape 10 having a base film 11, an adhesive film 12, and a cover film 13 laminated in this order, and a linking tape 30 having a linking matrix 31, an adhering film 32, and a release film 33 laminated in this order, linked to the adhesive tape 10.

Furthermore, the adhesive tape structure includes a one-sided adhesive tape 66 inserted between an adhesive film 12 and a cover film 13 on an edge portion of the adhesive tape 10 on a release termination side in the cover film release direction as well as between an adhering film 32 and a release film 33 on an edge portion of the linking tape 30 on a release initiation side in the cover film release direction.

The one-sided adhesive tape 66 connects an edge portion of the adhesive film 13 on the release termination side in the cover film release direction and an edge portion of the adhering film 32 on the release initiation side in the cover film release direction at a bonding surface 66a, and the center of the one-sided adhesive tape 66 is within the linking tape 30. Moreover, the surface opposite the bonding surface 66a is preferably release-treated.

According to the adhesive tape structure described in Example 15, due to easy release between the one-sided adhesive tape 66 and the cover film 13, in the edge portion of the adhesive tape 10 on the release termination side in the cover film release direction, blocking caused by protrusion of adhesive agent from the adhesive film 12 can be suppressed. Moreover, having the center of the one-sided adhesive tape 66 be within the linking tape 30 facilitates detaching remaining portions of the adhesive film 12.

The adhesive tape structure described in Example 15 can be obtained by, in the linking step described above, inserting a one-sided adhesive tape to connect between an adhesive film and a cover film on an edge portion of an adhesive tape raw sheet as well as between an adhering film and a release film on an edge portion of a linking tape raw sheet.

Example 16

Figure 18:
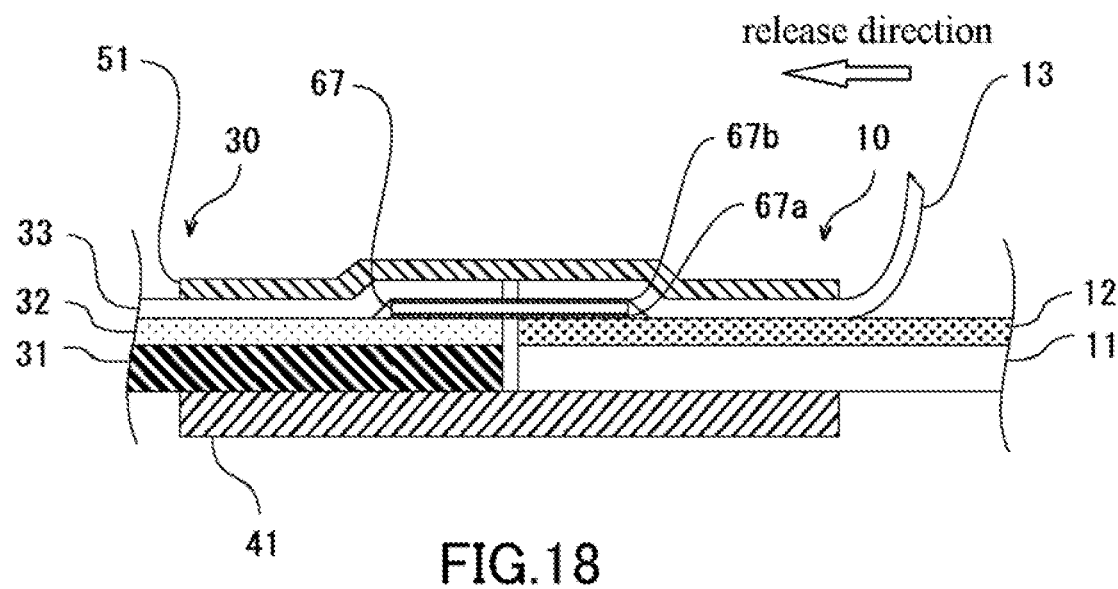
FIG. 18 is a cross-sectional view schematically illustrating a release termination side linking portion of an adhesive tape of Example 16.

FIG. 18 is a cross-sectional view schematically illustrating a release termination side linking portion of an adhesive tape of Example 16. An adhesive tape structure described in Example 16 includes, as in Example 15, an adhesive tape 10 and a linking tape 30.

Furthermore, the adhesive tape structure includes a double-sided adhesive tape 67 inserted between an adhesive film 12 and a cover film 13 on an edge portion of the adhesive tape 10 on a release termination side in the cover film release direction as well as between an adhering film 32 and a release film 33 on an edge portion of the linking tape 30 on a release initiation side in the cover film release direction.

The double-sided adhesive tape 67 connects an edge portion of the adhesive film 12 on the release termination side in the cover film release direction and an adhering film 32 on the release initiation side in the cover film release direction at a first bonding surface 67a and also connects an edge portion of a cover film 13 on the release termination side in the cover film release direction and an edge portion of the release film 33 on the release initiation side in the cover film release direction at a second bonding surface 67b. Furthermore, in the double-sided adhesive tape 67, an adhesive strength between the first bonding surface 67a and the adhesive film 12 is less than an adhesive strength between the second bonding surface 67b and the cover film 13.

According to the adhesive tape structure described in Example 16, because the double-sided adhesive tape 67 bonds between the adhesive film 12 and the cover film 13 on an end of the adhesive tape 10 on a release termination side in the cover film release direction as well as between the adhering film 32 and the release film 33 on an end of the linking tape 30 on the release initiation side in the cover film release direction, even in the case of stress being applied when the adhesive tape structure bends around a roller of an application apparatus, separation of the cover film 13 from the adhesive film 12 can be suppressed. Furthermore, in the double-sided adhesive tape 67, having the adhesive strength between the first bonding surface 67a and the adhesive film 12 less than the adhesive strength between the second bonding surface 67b cover film 13 facilitates detaching remaining portions of the adhesive film 12.

The adhesive tape structure described in Example 16 can be obtained by, in the linking step described above, inserting a double-sided adhesive tape to connect between an adhesive film and a cover film on an edge portion of an adhesive tape raw sheet as well as between an adhering film and a release film on an edge portion of a linking tape raw sheet.

Example 17

Figure 19:
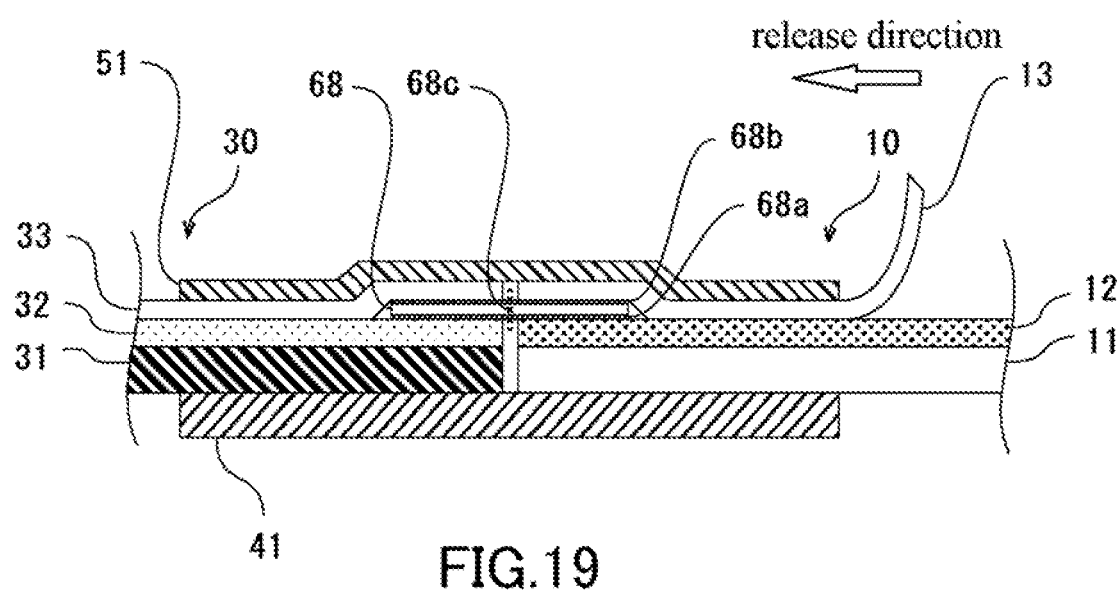
FIG. 19 is a cross-sectional view schematically illustrating a release termination side linking portion of an adhesive tape of Example 17.

FIG. 19 is a cross-sectional view schematically illustrating a release termination side linking portion of an adhesive tape of Example 17. An adhesive tape structure described in Example 17 includes an adhesive tape 10 having a base film 11, an adhesive film 12, and a cover film 13 laminated in this order, and a linking tape 30 having a linking matrix 31, an adhering film 32, and a release film 33 laminated in this order, linked to the adhesive tape 10.

Furthermore, the adhesive tape structure has a double-sided adhesive tape 68 inserted between the adhesive film 12 and the cover film 13 on an edge portion of the adhesive tape 10 on a release termination side in the cover film release direction as well as between the adhering film 32 and the release film 33 on an edge portion of the linking tape 30 on a release initiation side in the cover film release direction.

The double-sided adhesive tape 68 connects an edge portion of the adhesive film 12 on an edge portion on the release termination side in the cover film release direction and an edge portion of the adhering film 32 on the release initiation side in the cover film release direction at a first bonding surface 68a as well as connects an edge portion of the cover film 13 on a release termination side in the cover film release direction and an edge portion of the release film 33 on the release initiation side in the cover film release direction at a second bonding surface 68b. Furthermore, the center of the double-sided adhesive tape 68 has a slit 68c.

According to the adhesive tape structure described in Example 16, because the double-sided adhesive tape 68 bonds between the adhesive film 12 and the cover film 13 on an edge portion of the adhesive tape 10 on a release termination side in the cover film release direction as well as between the adhering film 32 and the release film 33 on an edge portion of the linking tape 30 on the release initiation side in the cover film release direction, even in the case of stress being applied when the adhesive tape structure bends around a roller of an application apparatus, separation of the cover film 13 from the adhesive film 12 can be suppressed. Furthermore, providing the double-sided adhesive tape 68 with a slit 68c in the center facilitates detaching remaining portions of the adhesive film 12.

The adhesive tape structure described in Example 17 can be obtained by, in the linking step described above, inserting a double-sided adhesive tape to connect between an adhesive film and a cover film on an edge portion of an adhesive tape raw sheet as well as between an adhering film and a release film on an edge portion of a linking tape raw sheet.

REFERENCE SIGNS LIST 1 adhesive tape, 2 reel, 3 unwinding shaft, 4a to 4e roller, 5 release roller, 6 cutter, 7 applicator, 8 stage, 10 first adhesive tape, 11 base film, 12 adhesive film, 13 cover film, 20 second adhesive tape, 21 base film, 22 adhesive film, 22a gap, 22b gap, 22c adhesive agent, 22d one-sided adhesive tape, 23 cover film, 30 linking tape, 31 linking matrix, 32 adhering film, 33 release film, 33a double-sided adhesive tape, 41 first base side adhesive member, 42 second base side adhesive member, 51, 51a, 51b first cover side adhesive member, 52 second cover side adhesive member, 61 double-sided adhesive tape, 62 double-sided adhesive tape, 63 one-sided adhesive tape, 64 one-sided adhesive tape, 65 double-sided release tape, 66 one-sided adhesive tape, 67 double-sided adhesive tape

The invention claimed is:
1. An adhesive tape structure comprising:
a plurality of adhesive tapes having a base film, an adhesive film, and a cover film laminated in this order; and
a linking tape linking the adhesive tapes and configured such that the cover films of the plurality of adhesive tapes are integrally released,
wherein the adhesive tapes have a gap between the base film and the cover film on an edge portion of a release initiation side in a cover film release direction.
2. The adhesive tape structure according to claim 1, wherein the gap has a length in a range of from 1 mm to 10 mm from a tip of the cover film in the cover film release direction.

3. The adhesive tape structure according to claim 2, wherein the adhesive tapes have a one-sided adhesive tape securing an edge of the adhesive film to the base film in the gap.

4. The adhesive tape structure according to claim 1, wherein the adhesive tapes have a one-sided adhesive tape securing an edge of the adhesive film to the base film in the gap.

5. The adhesive tape structure according to claim 1, wherein the adhesive tapes have (i) an adhesive agent portion having a predetermined length in the cover film release direction and (ii) the gap, in this order in the cover film release direction from a tip of the cover film, and the gap has a length in a range of from 1 mm to 10 mm in the cover film release direction.

6. A method for manufacturing an adhesive tape structure by using a plurality of adhesive tape raw sheets each having a base film, an adhesive film, and a cover film laminated in this order, the method comprising: removing at least a part of an edge portion of the adhesive film on one side in a long direction of each adhesive tape raw sheet, such that a gap is between the base film and the cover film; aligning the edge portions of the adhesive film of each adhesive tape raw sheet with each other having at least a part removed and linking between the adhesive tape raw sheets with a linking tape raw sheet; cutting the linked adhesive tape raw sheets and linking tape raw sheet to a predetermined length, such that (i) a plurality of adhesive tapes are formed, each having the base film, the adhesive film, and the cover film laminated in this order, and (ii) a linking tape is formed, linking the adhesive tapes and configured such that the cover films of the plurality of adhesive tapes are integrally released; and winding the adhesive tapes and the linking tape onto a reel such that the gap is on a release initiation side in a cover film release direction.

* * * * *